(12) United States Patent
Lyon et al.

(10) Patent No.: US 11,683,343 B2
(45) Date of Patent: *Jun. 20, 2023

(54) DISTRIBUTED NETWORK AND SECURITY OPERATIONS PLATFORM

(71) Applicant: Netography, Inc., Truckee, CA (US)

(72) Inventors: Barrett Lyon, Truckee, CA (US); Daniel Murphy, Miami, FL (US)

(73) Assignee: Netography, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,684

(22) Filed: Oct. 25, 2019

(65) Prior Publication Data

US 2020/0137117 A1 Apr. 30, 2020

Related U.S. Application Data

(60) Provisional application No. 62/751,437, filed on Oct. 26, 2018.

(51) Int. Cl.
| | |
|---|---|
| *H04L 29/06* | (2006.01) |
| *H04L 9/40* | (2022.01) |
| *H04L 67/10* | (2022.01) |
| *H04L 45/02* | (2022.01) |
| *H04L 12/46* | (2006.01) |
| *G06F 9/451* | (2018.01) |
| *H04L 51/02* | (2022.01) |
| *H04L 12/66* | (2006.01) |

(52) U.S. Cl.
CPC ............ *H04L 63/20* (2013.01); *G06F 9/453* (2018.02); *H04L 12/4641* (2013.01); *H04L 45/02* (2013.01); *H04L 51/02* (2013.01); *H04L 63/0218* (2013.01); *H04L 63/0263* (2013.01); *H04L 63/101* (2013.01); *H04L 63/1441* (2013.01); *H04L 67/10* (2013.01); *H04L 12/66* (2013.01)

(58) Field of Classification Search
CPC . H04L 63/20; H04L 63/0263; H04L 63/1441; H04L 63/101
See application file for complete search history.

(56) References Cited

U.S. PATENT DOCUMENTS

| | | | |
|---|---|---|---|
| 6,894,972 B1 | 5/2005 | Phaal | |
| 7,185,368 B2 * | 2/2007 | Copeland, III | ....... G06F 21/552 705/51 |

(Continued)

FOREIGN PATENT DOCUMENTS

JP 2016146581 8/2016

OTHER PUBLICATIONS

Nat Smith, An Overview of Fortinet's Integrated NOC-SOC Solution, Apr. 16, 2018, Business and Technology, pp. 1-8.*

*Primary Examiner* — Chirag R Patel
(74) *Attorney, Agent, or Firm* — Van Pelt, Yi & James LLP (57) ABSTRACT

A distributed network and security operations platform is disclosed. The disclosed platform comprises an external service that facilitates network and security operations for a private network. Data from nodes of the private network is received and analyzed by the service, and an output is automatically generated by the service in response to analyzing received data that facilitates modifying the routing performed by at least one or more of the nodes of the private network.

54 Claims, 6 Drawing Sheets

(56) References Cited

U.S. PATENT DOCUMENTS

| | | | |
|---|---|---|---|
| 7,873,993 B2* | 1/2011 | King | H04L 63/1483 726/11 |
| 9,246,828 B1* | 1/2016 | Tagore | H04L 47/11 |
| 9,774,694 B2* | 9/2017 | Shi | H04L 43/16 |
| 9,794,272 B2* | 10/2017 | Strub | H04L 63/1441 |
| 9,917,855 B1 | 3/2018 | Li | |
| 10,084,811 B1 | 9/2018 | Dinning | |
| 10,581,915 B2* | 3/2020 | Scherman | H04L 63/1425 |
| 2006/0265751 A1* | 11/2006 | Cosquer | H04L 63/1441 726/25 |
| 2007/0153689 A1 | 7/2007 | Strub | |
| 2007/0294416 A1 | 12/2007 | Agre | |
| 2010/0085957 A1 | 4/2010 | Elias | |
| 2011/0075674 A1 | 3/2011 | Li | |
| 2013/0086376 A1* | 4/2013 | Haynes | G06F 21/577 713/155 |
| 2016/0072836 A1 | 3/2016 | Hadden | |
| 2017/0063909 A1 | 3/2017 | Muddu | |
| 2018/0026944 A1* | 1/2018 | Phillips | H04L 63/1433 726/4 |
| 2018/0054458 A1* | 2/2018 | Marck | H04L 63/1458 |
| 2018/0189795 A1 | 7/2018 | Frenkel | |
| 2018/0335894 A1 | 11/2018 | Sarbin | |
| 2019/0097909 A1 | 3/2019 | Puri | |
| 2019/0103111 A1 | 4/2019 | Tiwari | |
| 2019/0182291 A1* | 6/2019 | Doron | H04L 63/1458 |
| 2019/0253274 A1 | 8/2019 | Van Dussen | |
| 2019/0260794 A1 | 8/2019 | Woodford | |
| 2020/0028866 A1 | 1/2020 | Kurakami | |
| 2020/0073999 A1 | 3/2020 | Zucker | |
| 2021/0058844 A1 | 2/2021 | Ringhiser | |

\* cited by examiner

FIG. 4 danm 6:02 PM
!chart proto ccli [APP] 6:02 PM
Flows by Protocol ▼ danm 6:02 PM
!help ccli [APP] 6:02 PM
All Help
'All Help' ▼

| Command | Arguments | Description |
|---|---|---|
| !help | none | - List all commands |
| !show help | none | - List all show commands |
| !show srcip | none | - Return the top source ips over the last hour |
| !show dstip | none | - Return the top destination ips over the last hour |
| !show last | none | - Return the last 20 raw flows |
| !show proto | none | - Return top protocols by flow |
| !sec help | none | - List all security commands |
| !sec portscan | none | - Return portscans that occurred in the last day |
| !sec xmastree | none | - Return any detected christmas tree packets |
| !chart help | none | - List all chart commands |
| !chart srcip | none | - Graph the top source ips over the last hour via pie chart |
| !chart srcipcard | none | - Graph the cardinality of source ips over the last 2 hours |
| !chart dstip | none | - Graph the top destination ips over the last hour via pie chart |
| !chart dstipcard | none | - Graph the cardinality of destination ips over the last 2 hours |
| !chart flowrate | [bydev] | - Graph the flowrate for the last 2 hours |
| !chart dstport | none | - Graph the flowsrate by destination port |
| !chart proto | none | - Graph top protocols by flow |
| !run help | none | - List all run commands |
| !run testtcp | ip\|hostname port | - Do a 3 way handshake to a supplied ip\|hostname and port |
| !run testhttp | url | - Do an http request to the supplied url and return trace data |
| !run cipherscan | ip\|hostname port | - Scan the supplied ip\|hostname and port for what protocols/ciphers are available |
| !run testssl | hostname port | - Test SSL connections to the specified target. Includes cert/state data. |
| !run mtr | ip\|hostname | - MTR to a destination. |

DISTRIBUTED NETWORK AND SECURITY OPERATIONS PLATFORM

CROSS REFERENCE TO OTHER APPLICATIONS

This application claims priority to U.S. Provisional Patent Application No. 62/751,437 entitled NETWORK OPERATIONS PLATFORM filed Oct. 26, 2018 which is incorporated herein by reference for all purposes.

BACKGROUND OF THE INVENTION

Existing architectures for network operations and security operations of private networks have suffered substantial scalability setbacks due to having limited computational resources while facing more complex and ever increasing amounts of traffic, encryption, storage, rulesets, etc. Thus, an improved network and security operations service is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Network and security operations are essential for any complex networking environment deployed by an enterprise or organization. A network is typically managed by a network operations center (NOC) via which network monitoring and control are facilitated. Security of a network is typically provided by a security operations center (SOC) via which detection, containment, and remediation of threats and attacks to the network are facilitated. Thus, network and security operations have traditionally been segregated. More recently, there exists an ongoing effort of bringing NOCs and SOCs closer together and leveraging the benefits of combining network and security operations.

A fusion network and security operations platform uniting network operations and security operations is disclosed herein. The disclosed platform comprises an out-of-band, cloud-based service that can be used on any network as a software as a service (SaaS). In some embodiments, the disclosed platform comprises a distributed intrusion detection and prevention system that is complementary to any existing security deployments on a monitored network. The network and security operations platform leverages the relatively unlimited computational power of the cloud to provide an additional layer of control and security to a monitored network, which by itself is limited in computational resources available for network and security operations. A monitored network may be dynamically and automatically optimized and secured, with or without human operator direction or intervention, based on remote monitoring and analysis. Moreover, remote tools associated with the service provide unprecedented monitoring and visualization of the monitored network.

As further described in detail herein, the disclosed platform collects real-time data from a monitored network in a decentralized cloud service where the collected data is analyzed according to a set of one or more proprietary system and/or user-definable custom algorithms. Alerts or actions against any network or security events detected in the analyzed data of the monitored network are automatically provided and/or performed in nearly real-time, for example, via an associated portal having a dashboard with user interface gauges and tools that provide situational awareness of the monitored network, via integration of an associated application programming interface (API) with existing network or security operations tools of the monitored network, and/or via appropriate adjustment of network routing policies by communication with network edge devices such as routers, switches, and cloud services.

Figure 1:
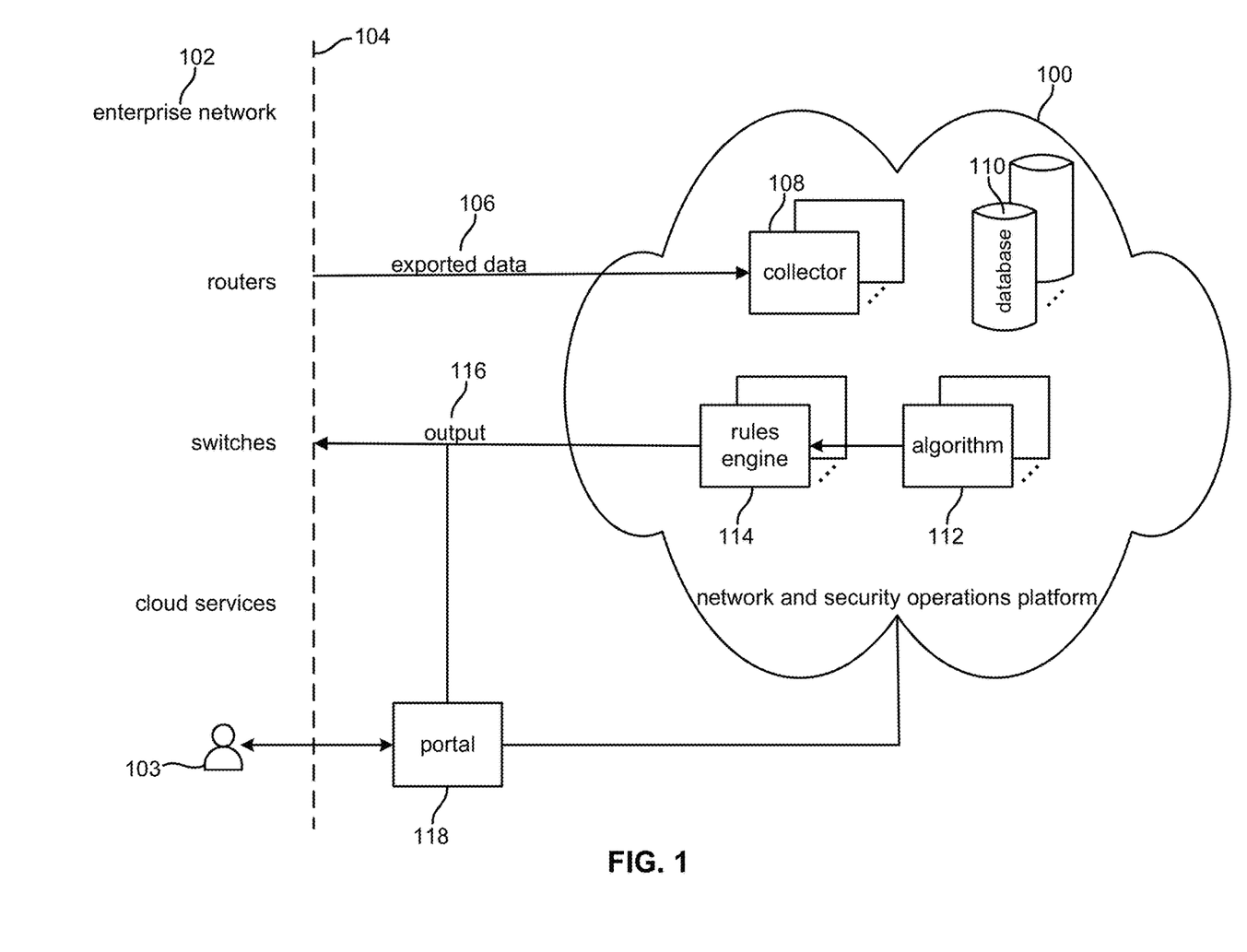
FIG. 1 is a high level block diagram illustrating an embodiment of an architecture of the disclosed network and security operations platform.

FIG. 1 is a high level block diagram illustrating an embodiment of an architecture of the disclosed network and security operations platform. Generally, network and security operations platform 100 may be employed to automatically defend monitored network 102 from threats and attacks, manage and optimize monitored network 102, and keep operators 103 of monitored network 102 informed of the current state of the network and nodes thereof, all in nearly real-time.

In some embodiments, network and security operations platform 100 is employed to provide an additional layer of security to monitored network 102 beyond any existing security measures already deployed in the network, such as firewalls and access-control lists (ACLs) on edge or border devices of the network. Network and security operations platform 100 may be employed to detect threats and attacks, anomalous usage behaviors, unusual protocols, dangerous networks, etc. Some examples of security events that may be handled by network and security operations platform 100 include distributed denial-of-service (DDoS) attacks, bots and botnets, unauthorized data extraction, port scans, enumeration attempts, and repeated login attempts. Some examples of security services provided by network and security operations platform 100 include cyber forensics, DDoS defenses, attack surface protection, access control list (ACL) management, active Internet Protocol (IP) reputation monitoring, data loss prevention (DLP), and remotely-triggered black hole (RTBH) routing.

Network and security operations platform 100, however, is not limited to detecting and responding to security events and providing security services but may also be employed to detect and respond to network operations events and provide network operations services with respect to monitored network 102. For example, network and security operations platform 100 may be employed to manage network resources and infrastructure, detect network saturation points, modify or optimize routes, ensure quality of service (QoS), manage bandwidth, facilitate billing services, etc.

Although a few components of network and security operations platform 100 are illustrated in FIG. 1 to describe the architecture of the platform, network and security operations platform 100 may generally have any appropriate types, numbers, and combinations of distributed and networked components. For example, although not depicted in FIG. 1, network and security operations platform 100 comprises a plurality of processing cores and associated memories. Various features of the disclosed network and security operations platform 100 are next described with respect to the network environment illustrated in FIG. 1.

In the example of FIG. 1, monitored network 102 comprises a private, enterprise network. Enterprise network 102 has an edge or border 104 defined by the physical devices and virtual services that collectively form the edge or border of the network. In the past, a network edge or border was typically constrained to devices such as routers and switches that were deployed in a controlled, private network environment. As networks have evolved, the network edge or border has also substantially spread across a plurality of external, third-party providers, such as providers of virtual private cloud (VPC) services. Thus, network perimeters have virtually disappeared, and borders have become fractured and decentralized.

By collecting and combining data both from physical edge or border devices comprising a private network (e.g., routers and switches) and from virtual service providers scattered across the Internet, the disclosed network and security operations platform facilitates unifying network and security control with near real-time coordination and situational awareness from a single point, effectively creating a synthetic border for a private, enterprise network. With respect to FIG. 1, for example, network and security operations platform 100 provides a wholistic view into private enterprise network 102 as well as a defined synthetic edge or border 104 of the network. More specifically, network and security operations platform 100 comprises a central point for receiving data from multiple physical and virtual nodes of network 102 and comprehensively viewing the entire network 102 as well as analyzing received data and facilitating appropriate alerts and actions in response to detected network and security events.

A response by network and security operations platform 100 with respect to a particular node or device of network 102 may be quickly scaled to the entire network. For example, network and security operations platform 100 may preemptively identify and remedy suspicious behavior at other nodes based on a detected security event at one of the network nodes. Moreover, since the services of network and security operations platform 100 are employed by several different private networks, security events detected and corrected on one network may in real-time be prevented or corrected on one or more other networks that network and security operations platform 100 monitors. That is, network and security operations platform 100 has a comprehensive view across multiple private networks, and, thus, has the benefit of being able to more quickly and automatically learn and identify similar events and patterns and respond with appropriate actions.

In the environment of FIG. 1, network appliances (e.g., routers and switches) and cloud services (e.g., VPC services) that define the edge or border 104 of network 102 are configured to export data 106 useful for network and security operations to network and security operations platform 100. For example, data 106 may comprise lightweight protocols such as network flow data and (e.g., system and/or server) log data. More specifically, in some embodiments, data 106 comprises any data or information that defines network communications but that does not have any payload or other sensitive (e.g., user-specific) information. In some cases, data 106 comprises a substantially continuous stream of data from network 102. However, data 106 may comprise sampled data rather than full packet capture data. Moreover, data 106 may be compressed and/or encrypted. Data 106 may be communicated from private network 102 to network and security operations platform 100 via a public network such as the Internet.

In some embodiments, network and security operations platform 100 is based on network flow data. That is, data 106 comprises flow records exported by network devices such as routers and switches as well as VPC services. Generally, a network flow refers to a communication channel between two end points or hosts bound by a session. More specifically, a network flow is defined as a unidirectional sequence of packets that share the same values for fields such as source IP address, destination IP address, source port, destination port, protocol type, type of service (ToS), and/or ingress interface. That is, a flow specifies a prescribed communication channel for a particular session, and packets sharing the same values for at least a subset of the aforementioned fields belong to the same flow. Many network devices (e.g., routers and switches) and cloud services (e.g., VPC services) are configured to extract measurements and data associated with a given flow and export such data for further analysis. Such a flow record may include various types of information including, for example, timestamps of the first and last packets of the flow, total number of bytes and packets observed in the flow, source/destination IP addresses, source/destination ports, protocol type, type of service (ToS) value, Transmission Control Protocol (TCP)

flags, routing information, I/O interface index information, and other details. The precise information extracted from a flow varies by provider and depends on both the device or service that generates the flow data as well as the protocol used to export the information.

Flow data has not been exploited much beyond its typical use for traffic engineering and routing. Flow data has been used in the past to detect DDoS attacks and trigger route changes to dedicated devices configured to handle such attacks. The use of flow data in the security realm has been limited largely because the data is sampled, i.e., the data is incomplete. However, despite being sampled, flow data can be leveraged for a variety of purposes. In some embodiments, the disclosed network and security operations platform 100 is configured to provide a full range of network and security services based on flow data. More specifically, network and security operations platform 100 is configured to receive, process, and store flow data as well as leverage flow data for network and security operations. Moreover, network and security operations platform 100 comprises a single, unified platform that supports a plurality of industry standard flow protocols, including, but not limited to, Internet Protocol Flow Information Export (IPFIX), NetFlow, SFlow, JFlow, VPC Flow Logs, etc. The algorithms and corresponding thresholds employed by network and security operations platform 100 may at least in part be based on the sampling rates of received flow data since different network nodes may have different sampling rates. Moreover, network and security operations platform 100 may be configured to automatically adjust the sampling rates of the flow data of nodes in network 102 via communication with the nodes or through an associated API.

Returning back to the description of the network environment of FIG. 1, data 106 from network 102 may be received, for example, by one or more distributed data collectors comprising network and security operations platform 100, such as data collector 108. Within network and security operations platform 100, received data 106 and/or parts thereof may be analyzed for network and security events; indexed for searchability; optionally enriched or tagged with applicable metadata or tags such as security, business, and/or performance details; and/or stored in one or more associated databases, such as database 110.

Various appropriate alerts or actions may be initiated or facilitated by network and security operations platform 100 in response to inferences made from analyzing received data 106. Real-time and/or historic monitoring and analysis of received data 106 may be performed by a set of one or more network and/or security algorithms 112. In various embodiments, the set of algorithms 112 may comprise one or more system algorithms generally applied across all data input into network and security operations platform 100, one or more algorithms customized for a prescribed enterprise network 102, one or more user-defined algorithms specified by operators 103 of network 102, or any combination thereof. Algorithms 112 are configured to identify network performance and security events such as anomalies, failures, threats, attacks, etc., in data 106 and generate appropriate alerts. Alerts on any network or security events detected by algorithms 112 are routed to one or more appropriate rules engines, such as rules engine 114. Rules engine 114 implements rules for responding to alerts generated by algorithms 112. That is, rules engine 114 facilitates one or more appropriate actions in response to detected network performance and/or security events by algorithms 112. In various embodiments, events or alerts may be mapped by rules engine 114 to default actions, and/or custom, user-definable actions may be specified for various events or alerts by users of network and security operations platform 100, such as by operators 103 of network 102. Examples of actions facilitated by rules engine 114 include dropping or simply logging a detected event or generated alert, providing a corresponding alert or notification via one or more channels, highlighting or providing another visual indication of a detected event or generated alert with respect to a graphical user interface element or tool used to display related data, facilitating route changes (such as for active blocking) by communicating with affected network nodes, etc. An output 116 generated by network and security operations platform 100 may be directly communicated to one or more applicable network nodes, may be made available and/or presented via a portal 118 of network and security operations platform 100 associated with a prescribed user or network account, and/or may be integrated via an associated API or plug-in with existing network tools or services, such as security information and event management (STEM) services, Slack, Trilio, Webhook, e-mail, short message service (SMS), automated scripts, etc.

A key feature of network and security operations platform 100 is facilitating dynamic and automatic route filtering, manipulation, and/or modification via communication with network edge nodes based on detected network and security events. From a security perspective, for example, this feature of network and security operations platform 100 may be employed for automatically adjusting, changing, or reconfiguring security policies, (VPC) security groups, access control lists (ACLs), etc., at one or more nodes of network 102 based on detected security threats and breaches. In some cases, output 116 comprises streaming real-time filter information (e.g., IP addresses to block) to edge or border nodes of network 102. Network and security operations platform 100 may communicate with network nodes via any appropriate communication protocol, such as Border Gateway Protocol (BGP), Flowspec, APIs, etc. Such protocols for route control have typically only been used by operators 103 of a given network 102 that are on the network 102. However, network and security operations platform 100 leverages remote triggering of such protocols to provide a further layer of control and security as well as to further automate network routing. For example, remote-triggering may be employed to inject a prescribed rule (e.g., route) into a monitored network and force network nodes to drop all traffic with a prescribed next-hop.

Network and security operations platform 100 effectively facilitates a new paradigm for network security by blocking intrusion events a posteriori, i.e., after they have been detected, compared to the typical security ethos of blocking a priori, i.e., before intrusions occur. Attempts to block malicious traffic before the traffic ever enters a network coupled with limitations in available computational resources at network end points has resulted in severe scalability setbacks for existing intrusion detection and prevention systems, especially as rule and signature complexities have grown. Scalability has further been limited because such systems attempt to block all known malicious traffic. However, reputation databases have become too large to be completely incorporated in end point access control lists. Thus, existing systems suffer security vulnerabilities. Such vulnerabilities are addressed by the disclosed network and security operations platform 100. Unprecedented scalability is feasible with the nearly limitless availability of processing and storage resources on the cloud but at the expense of introducing a trivial amount of latency between detection and remediation of an event such as a breach or attack. However, such a latency typically spans a time duration (e.g., of a few seconds) during which malicious activity is unable to detrimentally impact or otherwise significantly compromise the monitored network.

Thus, network and security operations platform 100 facilitates significantly more comprehensive security monitoring while having relatively limitless data processing and storage resource availability for analyzing received data with respect to algorithms, rules, signatures, reputation databases, etc. Network and security operations platform 100 delivers security responses in nearly real-time. That is, post detection, malicious or potentially malicious traffic is blocked using existing network infrastructure such as routers, switches, policy groups, DevOps calls to an associated API, etc. In some embodiments, network and security operations platform 100 only blocks bad or malicious traffic that has been detected, so any generated filters or block lists output by network and security operations platform 100 scale easily with respect to the capacities of access control lists of network nodes. This is in contrast to existing systems that attempt to block all known bad or malicious traffic regardless of whether such traffic has actually been seen on the network and as a result are limited by access control list capacities at network end points. In some embodiments, in order to provide a failsafe against false positives, network and security operations platform 100 is configured to block only individual IP address, i.e., single hosts, instead of large IP address blocks and/or to block only for prescribed (user-definable) time durations. Furthermore, network and security operations platform 100 provides an additional layer of security on top of any existing security measures already deployed on the monitored network. Thus, any malicious traffic not detected or not detected quickly enough may be detected by such existing security systems of the monitored network.

Each network monitored by network and security operations platform 100, such as network 102, has a prescribed user or network account with network and security operations platform 100 and associated portal 118. Portal 118 provides a set of interfaces into network and security operations platform 100 via which various services associated with network and security operations platform 100 may be selected, specified, and/or configured and via which data collected, processed, and stored by network and security operations platform 100 may be aggregated, displayed or visualized (e.g., via charts and graphs), queried, analyzed, or otherwise accessed. A central point is provided by portal 118 from which network operation teams, security operation teams, and developers associated with network 102 can operate their network and security posture. Portal 118 provides a customizable dashboard with user interface elements and tools for identifying, processing, analyzing, displaying, and generally comprehending real-time and historical information associated with monitored network 102. Furthermore, portal 118 provides user interfaces for writing custom scripts or algorithms, specifying or configuring thresholds and rules, and defining alerts or actions for detected events. A unified portal 118 allows different teams (e.g., SOC, NOC, DevOps, and business leaders) to use the same data and toolsets, resulting in reduced mean time to resolve detected network and security events. Moreover, by leveraging an API associated with network and security operations platform 100, different teams can apply unique business logic to their data to create actionable custom tools, for example, for managing security threats, route management, billing systems, etc.

In some embodiments, an easy-to-use, propriety query language is employed to better unify network and security operations platform 100, portal 118, and associated APIs and plug-ins. The query language associated with network and security operations platform 100 may be employed, for example, for tasks such as searching data, alerts, and interfaces; filtering statistics and aggregations; defining custom algorithms to alert on; etc. As previously described, tags may be added to received data records 106. Such tags are available for use with respect to portal 118, an associated API, and the proprietary query language. Software may be created around such simple tags/text. Leveraging tags throughout network and security operations platform 100 is helpful for keeping terminology consistent and to resolve complex data to human readable formats. Tags also allow for multi-tenant separation of data. In addition, tags may be used to associate customers, departments, locations, etc., to an IP address, autonomous system number (ASN), etc.

As described, comprehensive network and security operations tools and services are provided by network and security operations platform 100 as well as its associated portal 118, APIs, and plug-ins. Although some features have been described, the disclosed platform may generally be appropriately scaled and adjusted to provide any needed network and/or security operations services.

Figure 2:
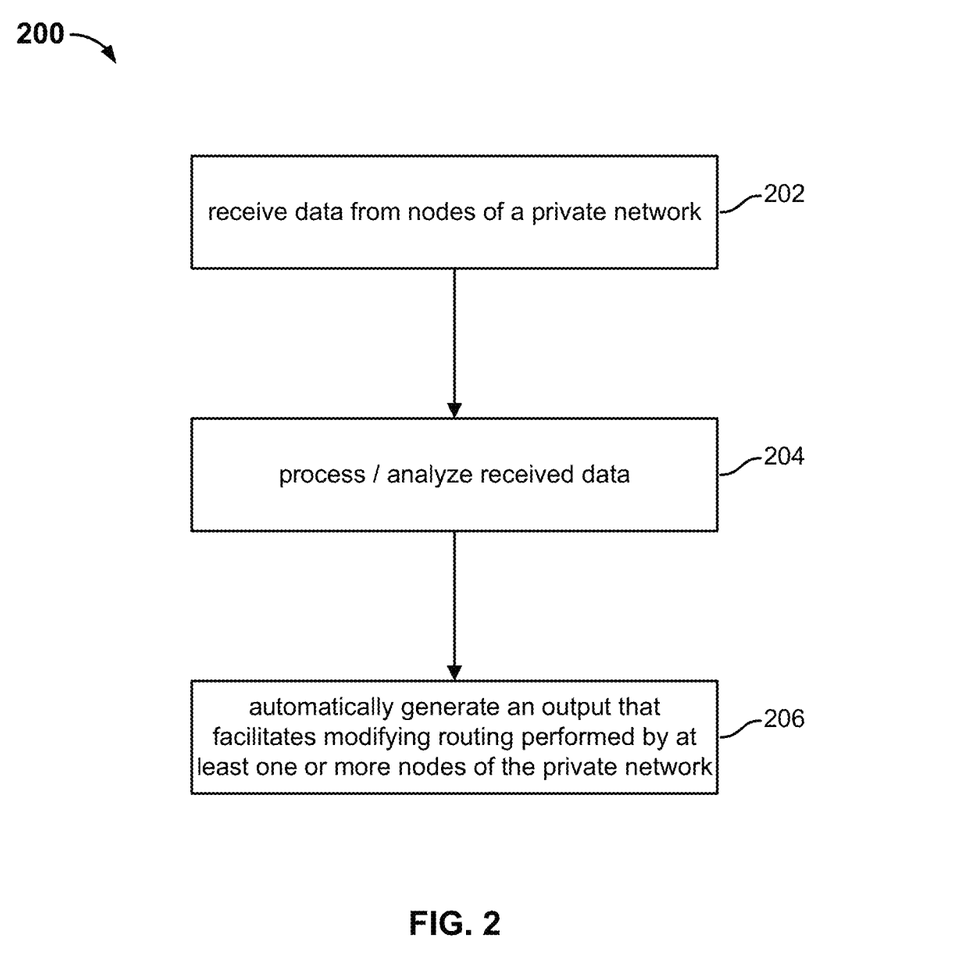
FIG. 2 is a high level flow chart illustrating an embodiment of a process for automatically generating a network and/or security response for a monitored private network from an external service.

FIG. 2 is a high level flow chart illustrating an embodiment of a process for automatically generating a network and/or security response for a monitored private network from an external service. Process 200 may be employed, for example, by network and security operations platform 100 of FIG. 1.

At step 202, data is received from one or more nodes of a private, enterprise network. More specifically, data is received at step 202 by a network and security operations service that is external to the private network such as a distributed, cloud-based service such as network and security operations platform 100 of FIG. 1. The received data may comprise nearly continuous data streams transmitted by edge or border nodes comprising the private network, such as routers, switches, cloud services, etc. In some cases, the received data is sampled, and different nodes of the private network may export data with different sampling rates. In some embodiments, the received data comprises lightweight protocols that do not have any payload or other sensitive information but rather basic information that specifies network communications such as flow data and log data protocols.

At step 204, the data received at step 202 is processed and analyzed. In various embodiments, step 204 may include analyzing the data for network performance and/or security events, for example, using various algorithms and rules; generating alerts and notifications on the data based on associated thresholds; indexing the data for searchability; enriching or tagging the data with applicable metadata or tags; storing or persisting the data in databases; presenting and generally making the data available with respect to an associated portal of the external service; etc.

At step 206, an output is automatically generated that facilitates modifying the routing performed by at least one or more nodes of the private network. For example, the output may be automatically generated at step 206 in response to detecting a network performance or security event at step 204 and may be generated by a rules engine that is configured to map a detected event to an action according to one or more rules. In some embodiments, the output facilitates route filtering, manipulation, and/or modification in the private network or nodes thereof. For example, the output may comprise a routing filter or block list. The output generated at step 206 may be communicated to nodes of the private network via BGP, FlowSpec, or an API associated with the external service. In some embodiments, the generated output or a notification or other associated information thereof may additionally be automatically made available via an associated portal of the external service and/or a third-party application with which the external service is integrated.

Process 200 may be employed to facilitate management and optimization of the private network as well as to defend the private network from threats and attacks. A nearly real-time and, in many cases, completely automatic response is generated as network and security events are detected in received data.

Figure 3:
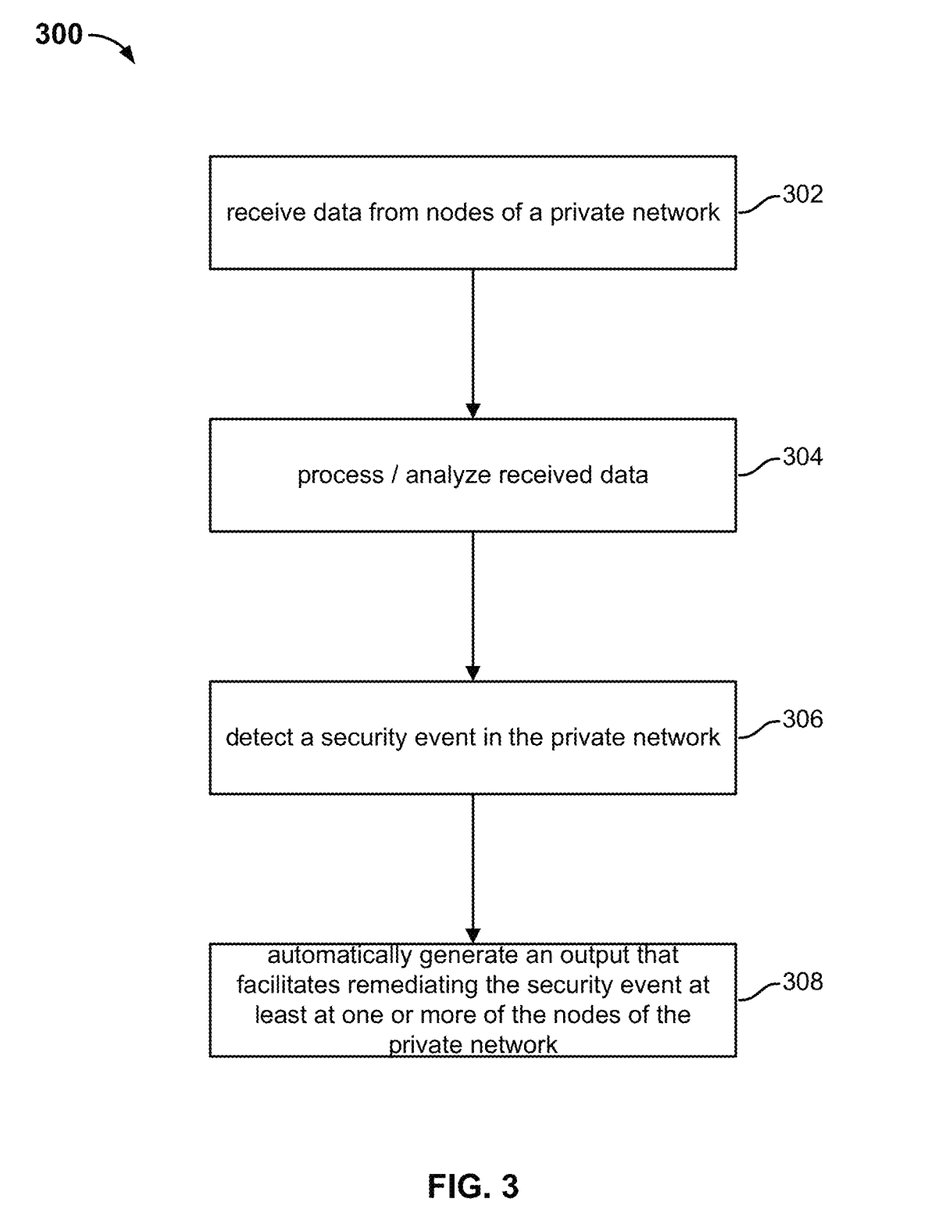
FIG. 3 is a high level flow chart illustrating an embodiment of a process for automatically generating a security response for a monitored private network from an external service.

FIG. 3 is a high level flow chart illustrating an embodiment of a process for automatically generating a security response for a monitored private network from an external service. Process 300 may be employed, for example, by network and security operations platform 100 of FIG. 1.

At step 302, data is received from one or more nodes of a private, enterprise network. More specifically, data is received at step 302 by a security service that is external to the private network such as a distributed, cloud-based service such as network and security operations platform 100 of FIG. 1. In some cases, the security service comprises a distributed intrusion detection and prevention system. The received data may comprise nearly continuous data streams transmitted by edge or border nodes comprising the private network, such as routers, switches, cloud services, etc. In some cases, the received data is sampled, and different nodes of the private network may export data with different sampling rates. In some embodiments, the received data comprises lightweight protocols that do not have any payload or other sensitive information but rather basic information that specifies network communications such as flow data and log data protocols.

At step 304, the data received at step 302 is processed and analyzed. In various embodiments, step 304 may include analyzing the data for security events using various algorithms and rules; generating alerts and notifications on the data based on associated thresholds; indexing the data for searchability; enriching or tagging the data with applicable metadata or tags; storing or persisting the data in databases; presenting and generally making the data available with respect to an associated portal of the external service; etc.

At step 306, a security event in the private network is detected from analyzing the data at step 304. For example, the security event may be associated with a DDoS attack, bot or botnet, unauthorized data extraction, port scan, enumeration attempt, repeated login, etc.

At step 308, an output is automatically generated in response to detecting the security event at step 306 that facilitates remediating the security event at least at one or more of the nodes of the private network. For example, the output may be automatically generated at step 308 by a rules engine that is configured to map a detected security event to an action according to one or more rules. In some embodiments, a latency exists between the security event occurring on the private network and being remediated during which time an entity responsible for the security event has access to the private network but, in most cases, not long enough to detrimentally affect or otherwise substantially compromise the network. In some embodiments, the output comprises a routing filter or block list. The output generated at step 308 may be communicated to nodes of the private network via BGP, FlowSpec, or an API associated with the external service. In some embodiments, the generated output or a notification or other associated information thereof may additionally be automatically made available via an associated portal of the external service and/or a third-party application with which the external service is integrated.

Process 300 may be employed to defend the private network from threats and attacks. A nearly real-time and, in many cases, completely automatic response is generated as security events are detected in received data. In some embodiments, (IP address) blocking is only performed with respect to threats or attacks that are actually detected so that blocking does not extend beyond the (e.g., ACL) capacities and capabilities of edge nodes. Moreover, blocking may be limited to single hosts and/or prescribed time durations.

Various collaboration services exist for different teams and team members to communicate. For example, a group chat or team messaging application may be employed. When teams of people are tasked with a given objective—whether it is monitoring performance, managing infrastructure, implementing security, triaging issues, or generally engaging in any type of analysis—a constant challenge is ensuring that the entire team is looking at the same dataset at the same time and that team members are aware in real-time of what other team members are doing. In existing team messaging environments, people typically individually collect data from different portals and then proceed to describe the data under consideration via messages or shared screenshots through the team messaging application and furthermore may also separately email the data to various team members. Thus, such team communications are typically inefficient, time consuming, and prone to misunderstandings and error. The disclosed network and security operations platform helps overcome such challenges and facilitates reducing incident resolution times as well as task completion times by providing a unified platform for network operators, security operators, developers, as well as any other groups or teams associated with managing an enterprise network. Moreover, in some embodiments, the disclosed network and security operations platform may be interfaced or integrated as a command line interface in existing collaboration or team messaging services.

Figure 4:
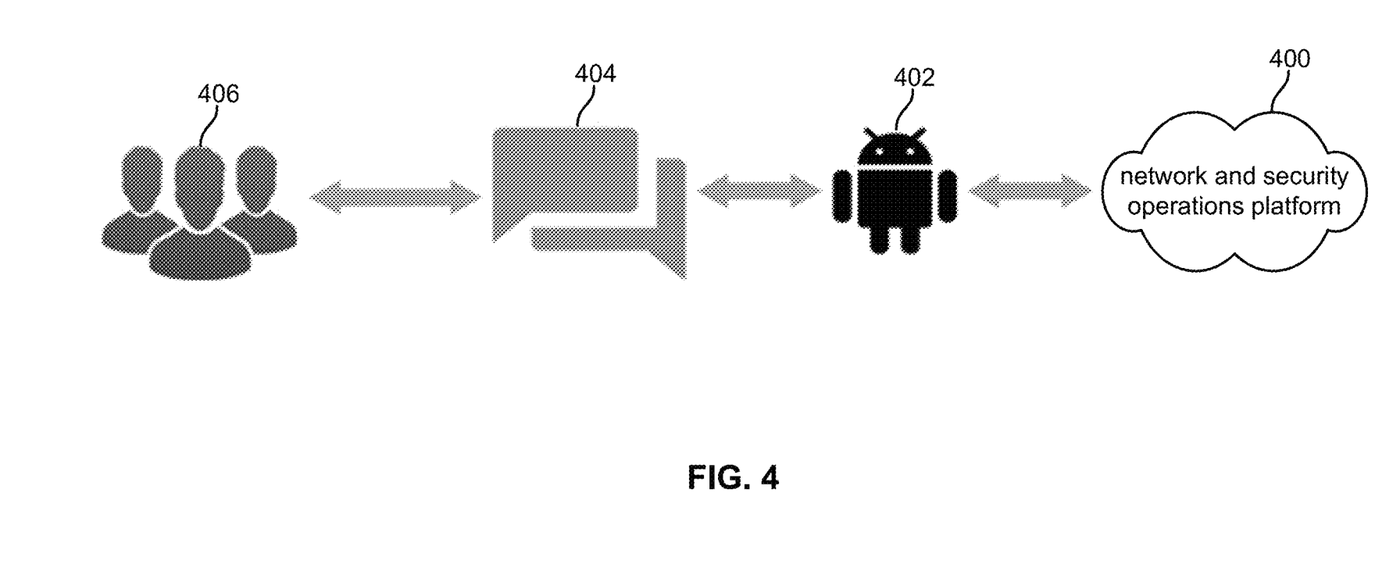
FIG. 4 is a high level block diagram illustrating an embodiment of interfacing the disclosed network and security operations platform with a team messaging service.

FIG. 4 is a high level block diagram illustrating an embodiment of interfacing the disclosed network and security operations platform with a team messaging service. Network and security operations platform 400 may comprise, for example, network and security operations platform 100 of FIG. 1. A robot (bot) 402 representing network and security operations platform 400 provides an interface to network and security operations platform 400 in a chat or channel of a team messaging application or service 404 via which members of one or more teams 406 communicate with each other. In some embodiments, all users 406 of channel 404 see everything happening on channel 404 at the same time and in real-time. Alternatively, in some embodiments, content of channel 404 that is visible to a prescribed user 406 may be restricted according to associated user permissions. In general, team messaging service 404 may comprise any collaboration tool, application, or service. As one example, team messaging service 404 may comprise an application such as Slack. In some embodiments, network and security operations platform 400 has a master channel or workspace with a team messaging service that includes a plurality of guest channels, and each user or client (i.e., network) registered with network and security operations platform 400 is assigned a dedicated guest channel. Alternatively, a prescribed network (e.g., that is a user or client of network and security operations platform 400) may independently have a channel with a team messaging service to which network and security operations platform 400 is added as a user.

Bot 402 monitors activity on channel 404 as users 406 exchange messages and participates in the channel conversation when applicable. Bot 402 appears and behaves just like any other user 406 of channel 404. However, bot 402 furthermore integrates into channel 404 a command line interface to network and security operations platform 400. More specifically, bot 402 facilitates in making channel 404 a command line interface into network and security operations platform 400. The command line interface specifically comprises a collaborative command line interface (CCLI). A traditional command line interface is a one-to-one (i.e., one person to one user session) interface. In contrast, the disclosed collaborative command line interface is a many-to-one (i.e., a group of people to one user session, e.g., of network and security operations platform 400) interface. Thus, the collaborative command line interface comprises a mechanism for interacting with a service or group of services (e.g., network and security operations platform 400) by many people in a shared manner. Moreover, traditional command line interfaces are completely text-based. In contrast, the disclosed collaborative command line interface supports outputting of any multi-media content (e.g., images, audio, video, etc.) supported by the service 404 into which it is integrated.

Various commands are supported by the disclosed collaborative command line interface. That is, bot 402 provides a prescribed set of services in response to corresponding commands. More specifically, bot 402 is configured to recognize associated commands (e.g., based on an identifying character such as a bang (!) that, for instance, prefixes the commands), initiate one or more appropriate actions in response to the commands with respect to network and security operations platform 400, and provide appropriate responses in channel 404. A user 406 can issue a command in real-time, and other users 406 can see both the issued command and the result of the command in real-time. Thus, the disclosed collaborative command line interface essentially comprises a robot 402 that listens for commands on channel 404, acts on those commands by interacting with various applicable components of the infrastructure of network and security operations platform 400 on behalf of the users issuing them, and presents results back into the channel 404 from which the commands were received. The command line interface communications with bot 402 in channel 404 are in-band, with bot 402 detecting and responding to commands addressed to bot 402 in-line as if it were another user on channel 404. In contrast, for instance, slash commands in a service like Slack are out-of-band since the commands are transmitted outside of Slack for fulfillment.

One example of an embodiment of a process that may be employed by bot 402 comprises the steps of receiving a message, performing a security check (e.g., a permission level check of the user that posted the message), determining validity of a command comprising the message, executing the command, and outputting or displaying the result on the command line interface in response to the posted message or command.

In some embodiments, communications with bot 402 in channel 404 are not limited to just prescribed commands, but bot 402 may also be directly messaged just like any other user on the channel, with bot 402 initiating appropriate actions or responding with applicable data. In addition to being directly or indirectly invoked, bot 402 may also be configured to infer the needs of the current conversation on channel 404 and post appropriate data, initiate appropriate actions, and/or inform and facilitate involvement of human operators of network and security operations platform 400 to address automatically identified issues or concerns in channel 404. In some embodiments, bot 402 may provide other features such as identifying and isolating a discussion of a prescribed matter and ticketing it with a reference number so that it can be later referenced, searched, and/or retrieved from the messaging history. In some embodiments, bot 402 may be configured for natural language communication, e.g., to help with support on channel 404.

Figure 5:
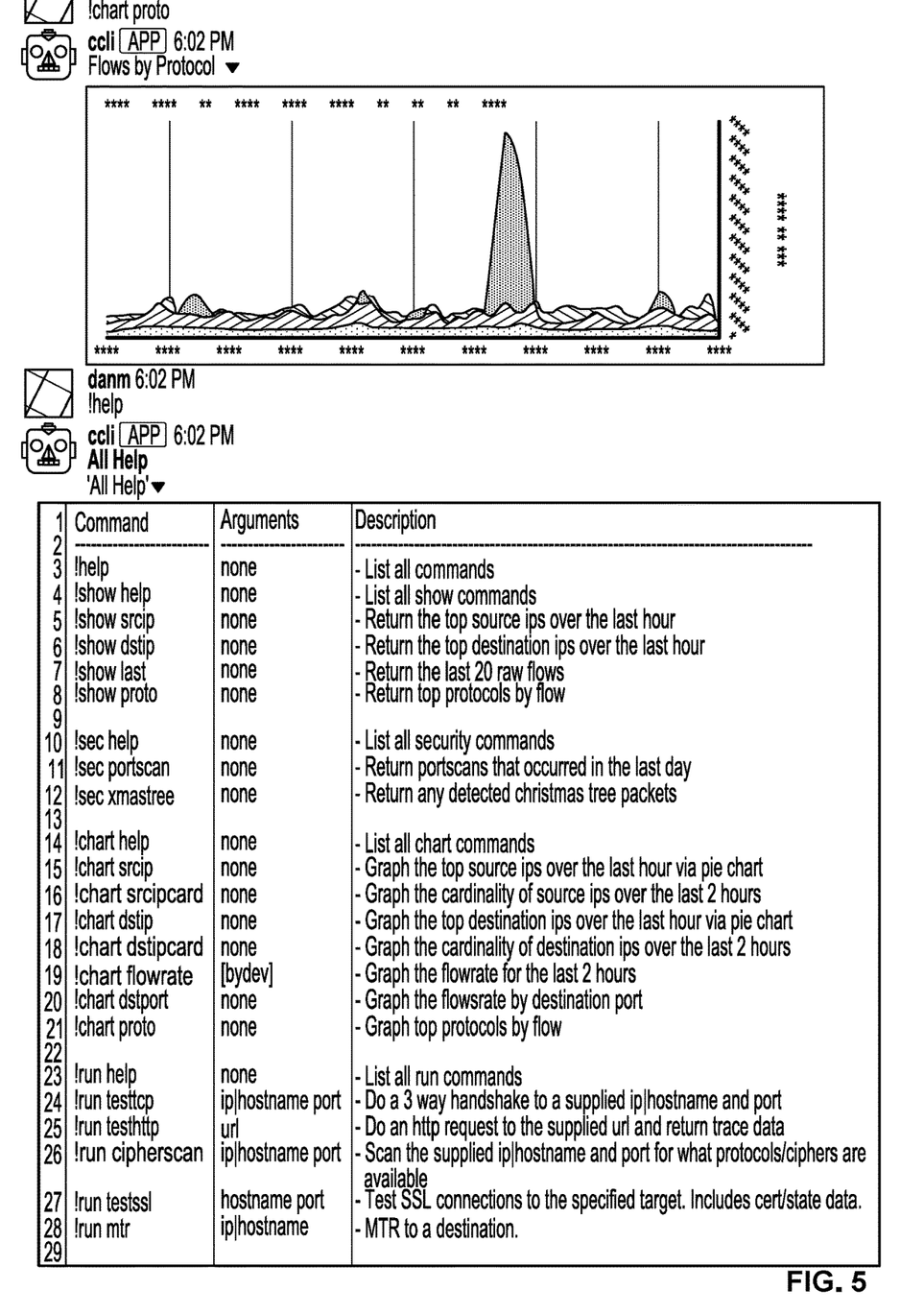
FIG. 5 illustrates example collaborative command line interface interactions in a channel.

FIG. 5 illustrates example collaborative command line interface interactions in a channel. As depicted, a bot appears as a user ('ccli') in the channel and communicates and responds to commands in-band in the command line interface comprising the channel. Bot commands are prefixed by a bang (i.e., exclamation mark). The bot responds to a command with appropriate data or actions. In the given example, a chart (i.e., an image of a requested chart) is returned by the bot in response to a command requesting a chart of prescribed data from a user ('danm') on the channel, and a list of all available commands with respect to the command line interface is provided by the bot in response to a '!help' command by the same user.

Figure 6:
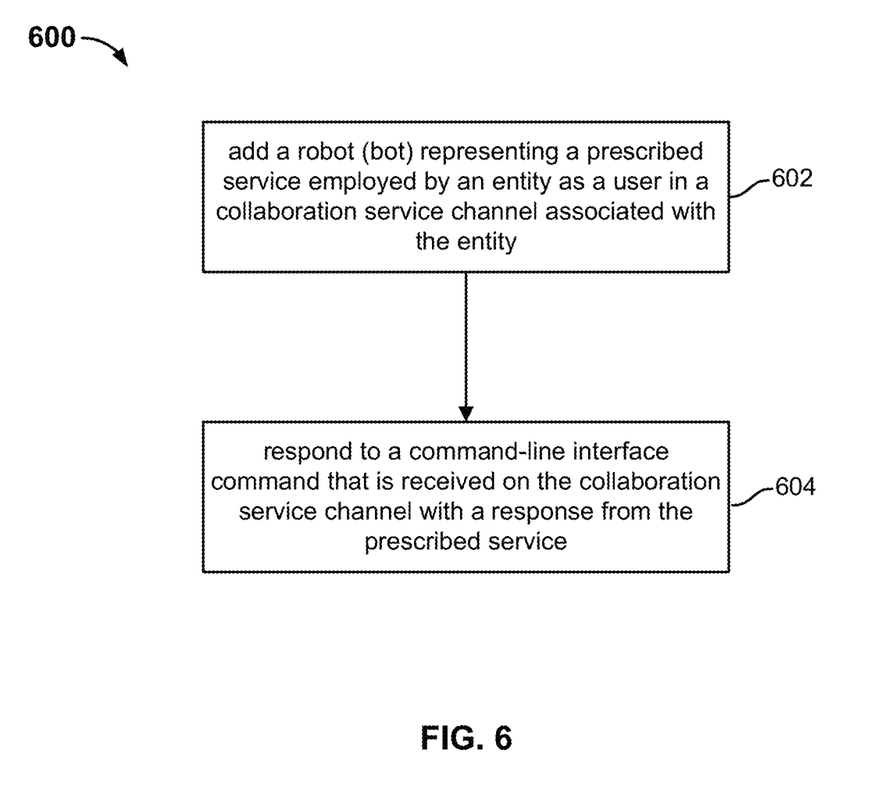
FIG. 6 is a high level flow chart illustrating an embodiment of a process for integrating or interfacing a prescribed service employed by an entity in a collaboration service channel associated with the entity.

FIG. 6 is a high level flow chart illustrating an embodiment of a process for integrating or interfacing a prescribed service employed by an entity in a collaboration service channel associated with the entity. In some embodiments, the prescribed service comprises a distributed route filtering and manipulation service that facilitates managing and optimizing a private network comprising the entity and/or defending the private network from security threats and attacks. As one example, the prescribed service comprises the disclosed network and security operations platform (e.g., network and security operations platform 100 of FIG. 1 or network and security operations platform 400 of FIG. 4), the entity comprises a private network (e.g., enterprise network 102 of FIG. 1), and the collaboration service channel comprises a channel of a team messaging application such as Slack that is associated with the private network.

At step 602, a robot (bot) representing the prescribed service is configured and included or added as a user in the collaboration service channel. The bot appears and behaves like any other user on the collaboration service channel. However, the bot additionally facilitates in making the collaboration service channel a command line interface that interfaces with the prescribed service. The command line interface comprises a collaborative command line interface that interfaces a plurality of users on the collaboration service channel to the prescribed service. Command line interface communications with the bot are in-band or in-line in the collaboration service channel. The command line interface supports output of multi-media content.

At step 604, a command associated with the command line interface that is received on the collaboration service channel is responded to with a response from the prescribed service. The response may comprise an action performed by the prescribed service and/or posting of data received from the prescribed service in the command line interface comprising the collaboration service channel. For example, the response may comprise a network or security operations response by the prescribed service with respect to the private network comprising the entity as well as a corresponding alert or notification in the command line interface comprising the collaboration service channel.

In some embodiments, different users of the collaboration service channel may have different permissions with respect to actions and/or data of the prescribed service. In such cases, user permissions may be verified prior to a response being generated by the prescribed service, and a response may be denied if the right permissions for a command or associated data are not held by a user issuing the command. In some embodiments, the command line interface is read-only and hence purely informational. In some embodiments, the command line interface furthermore supports write commands into the prescribed service. A separate user authentication step (e.g., with respect to the prescribed service) may need to be completed prior to execution of a write command.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving data from edge nodes of a private network at an external service that is external to the private network, wherein the data includes information defining communication sessions but not packet payload information, wherein the edge nodes of the private network collectively form a border of the private network, and wherein the external service is configured to automatically adjust sampling rates of data received from the edge nodes of the private network via communication with the edge nodes of the private network;
   analyzing the received data at the external service; and
   automatically generating an output from the external service in response to analyzing the data that is communicated to at least one or more edge nodes of the private network and that facilitates modifying routing by the at least one or more edge nodes of the private network.

2. The method of claim 1, wherein the data comprises a data stream.

3. The method of claim 1, wherein the data comprises sampled data.

4. The method of claim 1, wherein the data comprises flow data.

5. The method of claim 1, wherein the data comprises log data.

6. The method of claim 1, wherein edge nodes of the private network comprise routers, switches, or both.

7. The method of claim 1, wherein edge nodes of the private network comprise virtual private cloud services.

8. The method of claim 1, wherein the external service provides network and security operations for the private network.

9. The method of claim 1, wherein the external service facilitates managing and optimizing the private network.

10. The method of claim 1, wherein the external service facilitates defending the private network from threats and attacks.

11. The method of claim 1, further comprising tagging the data at the external service.

12. The method of claim 1, further comprising storing the data at the external service.

13. The method of claim 1, wherein analyzing the received data at the external service comprises detecting a network performance or security event.

14. The method of claim 1, wherein the output is generated by a rules engine of the external service that is configured to map a detected event to an action.

15. The method of claim 1, wherein the output comprises a routing filter or block list.

16. The method of claim 1, wherein the output is communicated to the at least one or more edge nodes of the private network via Border Gateway Protocol (BGP) or FlowSpec.

17. The method of claim 1, wherein the output is communicated to the at least one or more edge nodes of the private network via an application programming interface (API).

18. The method of claim 1, further comprising providing a portal to the external service that is accessible to an operator of the private network.

19. A system, comprising:
   one or more databases of an external service that is external to a private network configured to store data associated with the private network; and
   one or more processors of the external service configured to:
      receive data from edge nodes of the private network, wherein the data includes information defining communication sessions but not packet payload information, wherein the edge nodes of the private network collectively form a border of the private network, and wherein the external service is configured to automatically adjust sampling rates of data received from the edge nodes of the private network via communication with the edge nodes of the private network;
      analyze the received data at the external service; and
      automatically generate an output from the external service in response to analyzing the data that is communicated to at least one or more edge nodes of the private network and that facilitates modifying routing by the at least one or more e nodes of the private network.

20. The system of claim 19, wherein the data comprises a data stream.

21. The system of claim 19, wherein the data comprises sampled data.

22. The system of claim 19, wherein the data comprises flow data.

23. The system of claim 19, wherein the data comprises log data.

24. The system of claim 19, wherein edge nodes of the private network comprise routers, switches, or both.

25. The system of claim 19, wherein edge nodes of the private network comprise virtual private cloud services.

26. The system of claim 19, wherein the external service provides network and security operations for the private network.

27. The system of claim 19, wherein the external service facilitates managing and optimizing the private network.

28. The system of claim 19, wherein the external service facilitates defending the private network from threats and attacks.

29. The system of claim 19, wherein the processor is further configured to tag the data at the external service.

30. The system of claim 19, wherein the processor is further configured to store the data at the external service.

31. The system of claim 19, wherein to analyze the received data at the external service comprises to detect a network performance or security event.

32. The system of claim 19, wherein the output is generated by a rules engine of the external service that is configured to map a detected event to an action.

33. The system of claim 19, wherein the output comprises a routing filter or block list.

34. The system of claim 19, wherein the output is communicated to the at least one or more edge nodes of the private network via Border Gateway Protocol (BGP) or FlowSpec.

35. The system of claim 19, wherein the output is communicated to the at least one or more edge nodes of the private network via an application programming interface (API).

36. The system of claim 19, wherein the processor is further configured to provide a portal to the external service that is accessible to an operator of the private network.

37. A computer program product embodied in a non-transitory computer readable medium and comprising computer instructions for:
receiving data from edge nodes of a private network, wherein the computer program product is associated with an external service that is external to the private network, wherein the data includes information defining communication sessions but not packet payload information, wherein the edge nodes of the private network collectively form a border of the private network, and wherein the external service is configured to automatically adjust sampling rates of data received from the edge nodes of the private network via communication with the edge nodes of the private network;
analyzing the received data at the external service; and
automatically generating an output from the external service in response to analyzing the data that is communicated to at least one or more edge nodes of the private network and that facilitates modifying routing by the at least one or more edge nodes of the private network.

38. The computer program product of claim 37, wherein the data comprises a data stream.

39. The computer program product of claim 37, wherein the data comprises sampled data.

40. The computer program product of claim 37, wherein the data comprises flow data.

41. The computer program product of claim 37, wherein the data comprises log data.

42. The computer program product of claim 37, wherein edge nodes of the private network comprise routers, switches, or both.

43. The computer program product of claim 37, wherein edge nodes of the private network comprise virtual private cloud services.

44. The computer program product of claim 37, wherein the external service provides network and security operations for the private network.

45. The computer program product of claim 37, wherein the external service facilitates managing and optimizing the private network.

46. The computer program product of claim 37, wherein the external service facilitates defending the private network from threats and attacks.

47. The computer program product of claim 37, further comprising computer instructions for tagging the data at the external service.

48. The computer program product of claim 37, further comprising computer instructions for storing the data at the external service.

49. The computer program product of claim 37, wherein analyzing the received data at the external service comprises detecting a network performance or security event.

50. The computer program product of claim 37, wherein the output is generated by a rules engine of the external service that is configured to map a detected event to an action.

51. The computer program product of claim 37, wherein the output comprises a routing filter or block list.

52. The computer program product of claim 37, wherein the output is communicated to the at least one or more edge nodes of the private network via Border Gateway Protocol (BGP) or FlowSpec.

53. The computer program product of claim 37, wherein the output is communicated to the at least one or more edge nodes of the private network via an application programming interface (API).

54. The computer program product of claim 37, further comprising computer instructions for providing a portal to the external service that is accessible to an operator of the private network.

* * * * *

UNITED STATES PATENT AND TRADEMARK OFFICE
CERTIFICATE OF CORRECTION

| | | |
|---|---|---|
| PATENT NO. | : 11,683,343 B2 | Page 1 of 1 |
| APPLICATION NO. | : 16/664684 | |
| DATED | : June 20, 2023 | |
| INVENTOR(S) | : Barrett Lyon and Daniel Murphy | |

It is certified that error appears in the above-identified patent and that said Letters Patent is hereby corrected as shown below:

In the Specification

In Column 6, Line(s) 19, delete "(STEM)", and insert --(SIEM)--, therefor.

Signed and Sealed this
Fifth Day of December, 2023

Katherine Kelly Vidal
*Director of the United States Patent and Trademark Office*